W. GREBLER AND L. OSKOW.
AUTOMATIC AWNING CONTROL DEVICE.
APPLICATION FILED JUNE 18, 1919.
1,408,424. Patented Feb. 28, 1922.
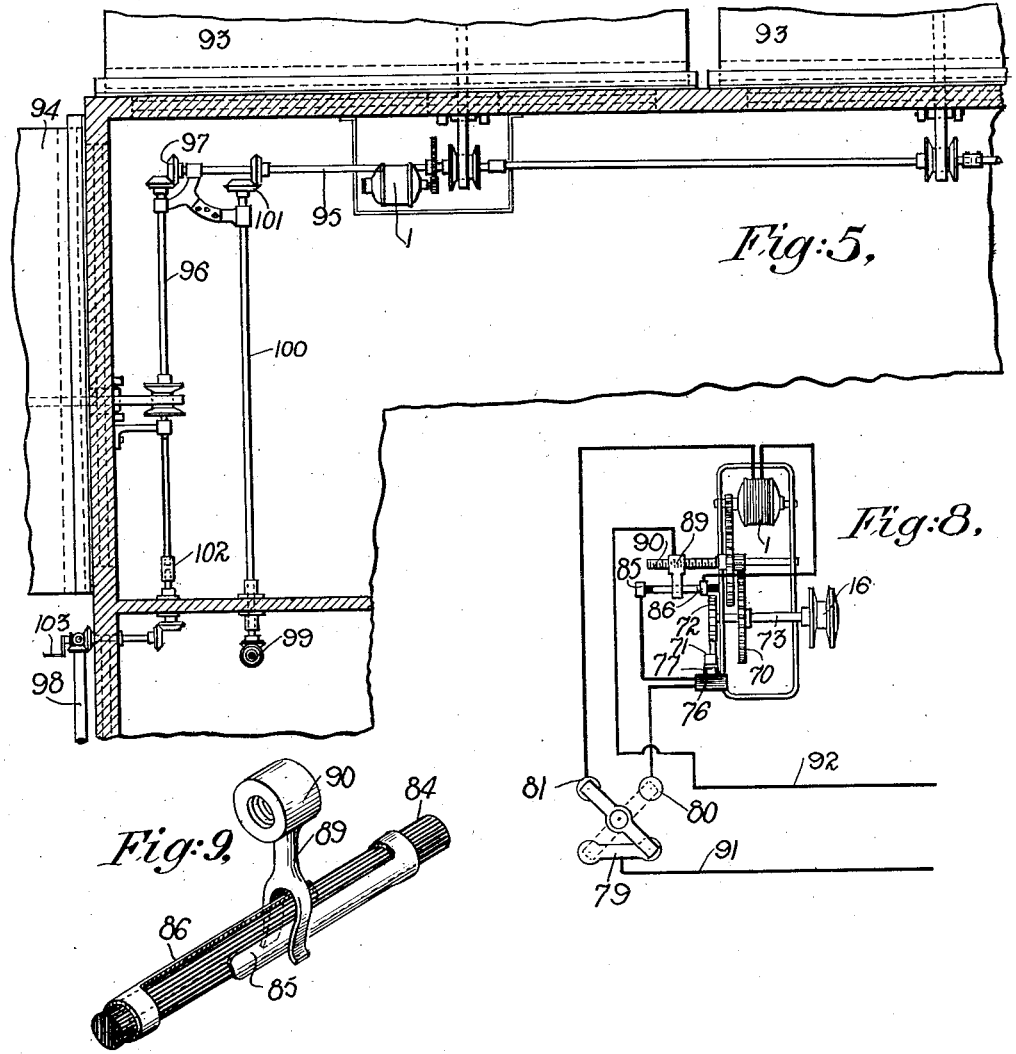

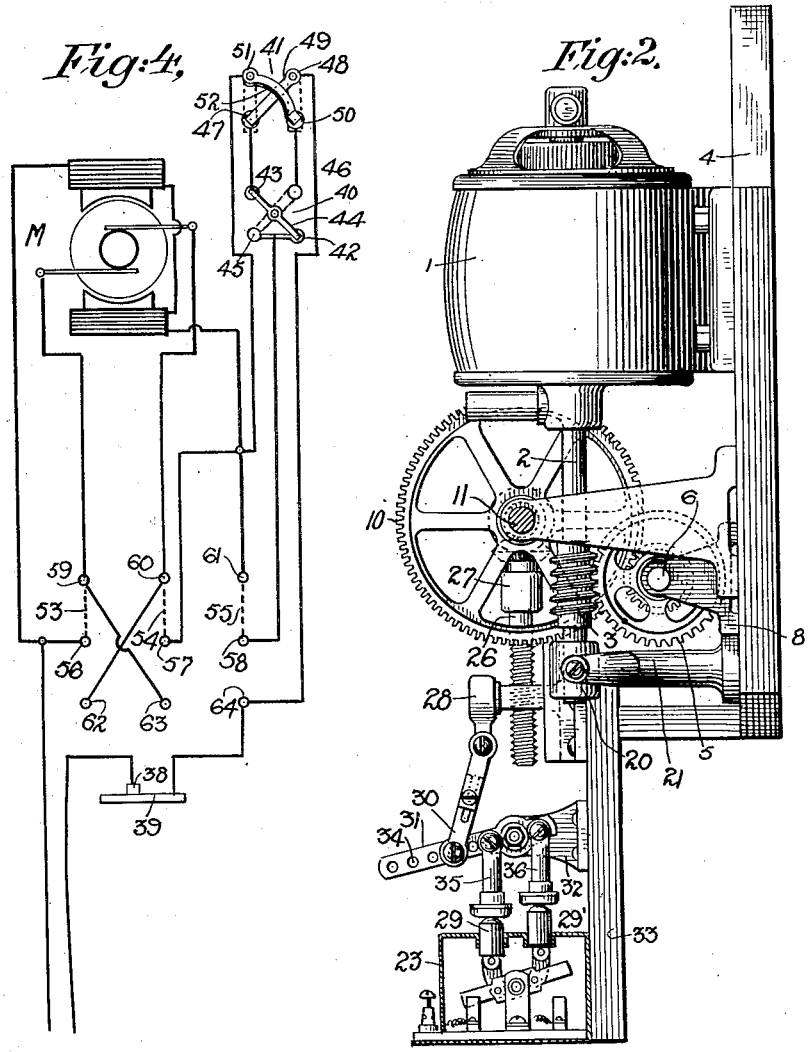

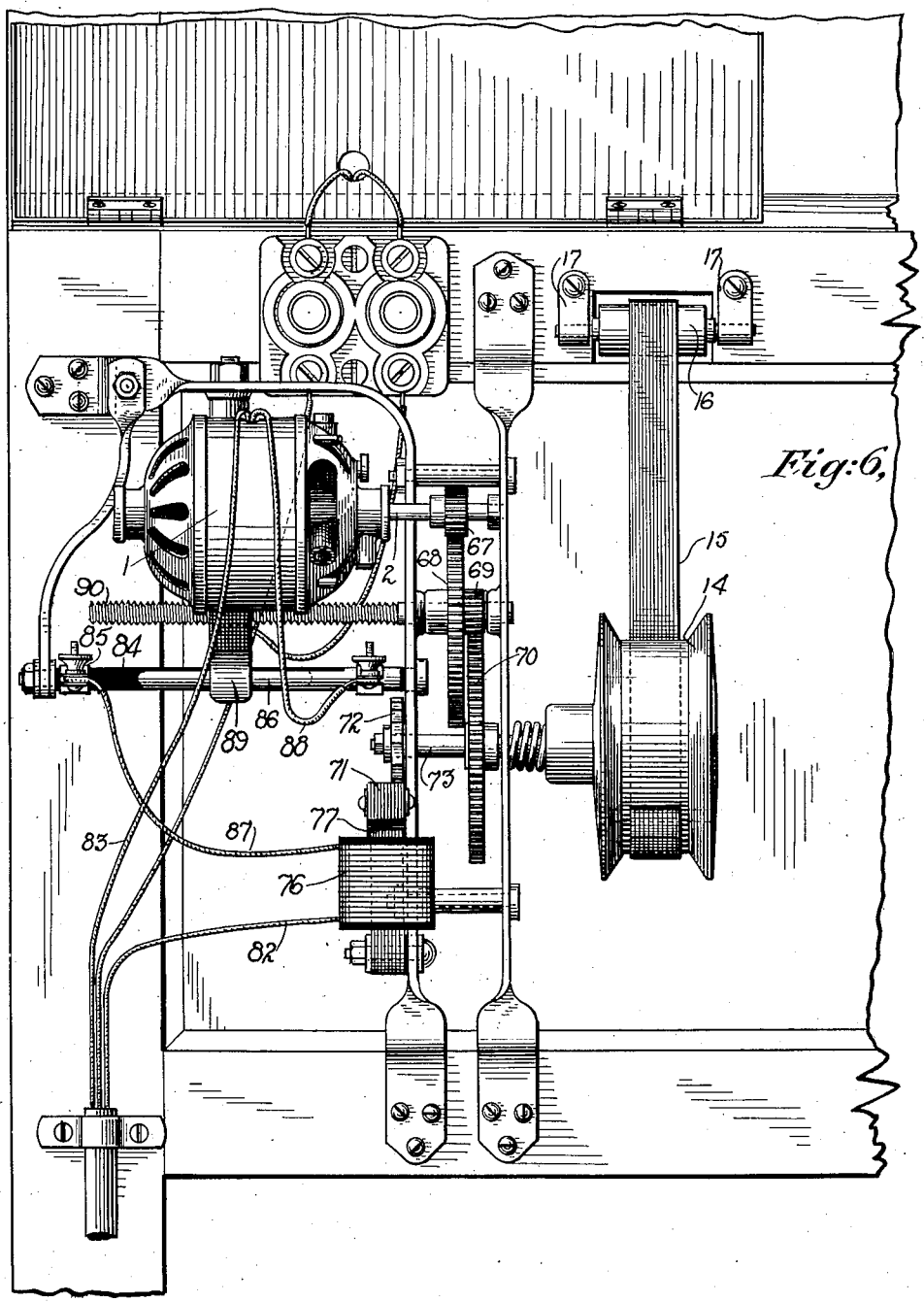

W. GREBLER AND L. OSKOW.
AUTOMATIC AWNING CONTROL DEVICE.
APPLICATION FILED JUNE 18, 1919.

1,408,424.

Patented Feb. 28, 1922.
5 SHEETS—SHEET 5.

WITNESSES
E. N. Hagen
E. B. Gale.

INVENTORS
Wm. Grebler & Louis Oskow,
BY
ATTORNEYS

UNITED STATES PATENT OFFICE.

WILLIAM GREBLER AND LOUIS OSKOW, OF BROOKLYN, NEW YORK

AUTOMATIC AWNING-CONTROL DEVICE.

1,408,424. Specification of Letters Patent. Patented Feb. 28, 1922.

Application filed June 18, 1919. Serial No. 305,163.

*To all whom it may concern:*

Be it known that we, WILLIAM GREBLER and LOUIS OSKOW, citizens, respectively, of Austria and Russia, declarants to become citizens of the United States, and residents of the city of New York, borough of Brooklyn, in the county of Kings and State of New York, have invented a new and Improved Automatic Awning-Control Device, of which the following is a full, clear, and exact description.

This invention relates generally to an automatic electro-mechanical control system and more specifically to a means particularly adapted for controlling the movement of awnings and the like.

One of the objects of this invention is to provide with an awning, an electro-mechanical means for moving said awning and a system of control therefor, whereby the said awning may be automatically stopped at the limits of travel and may be stopped and held in any position intermediate the limits of travel of said awning.

Another object of this invention is to provide in the combination of an electric power means, an awning and a driving connection therebetween, a driving connection of such a character that will function as a braking member to hold the awning, when stopped, in any position against further movement independent of other braking means until again moved by the prime mover.

More specifically, one of the objects of this invention is to provide in the combination of an awning and an electric motor therefor, a worm and gear as a driving connection therebetween.

A further object of this invention is to provide in the above combination a method of control therefor in which the awning is automatically controlled at the limits of travel.

A further object of this invention is to provide in the combination of an awning and an electric motor, an automatic system of control therefor whereby at the limits of travel further movement of the awning is arrested by a means for automatically opening the motor circuit and changing or reversing the motor connections for movement in the opposite direction.

A further object of this invention is to provide in a control system for an electric power actuated awning, a means for automatically stopping the movement of the awning at the limits of travel and reestablishing the motor connections for movement in the opposite direction, and a means for manually controlling the movement of the awning intermediate the limits of travel.

Still a further object of this invention is to provide an automatic control system for an awning in which the movement of the awning in either direction may be controlled by one manually operable switch.

Still another object of this invention is to provide in the combination of an electric motor, an awning, a driving connection therebetween and a system of control therefor, a means for adjusting and changing the points at which the awning will be automatically brought to rest and have the connections changed for movement in the opposite direction.

A further object of this invention is to provide an electric power means for moving an awning and an automatic system of control therefor which may be conveniently and readily applied to awnings already installed and manually operated including the belt and the gear operated type.

In the preferred form an electric motor is provided as a source of power to drive the awning in either direction through a worm and gear connection. There is included in the automatic system of control a reversing switch and a supplemental switch automatically actuated to interrupt the circuit and reestablish the motor connections for movement in the opposite direction, and a manually operable switch which may be used to arrest movement of the awning intermediate the limits of travel in either direction, and to again reestablish the circuit, the movement is to be continued in the same direction.

In the preferred construction the reversing switch and the supplemental switch are preferably formed as one self-contained unit, automatically actuated at the limits of travel. The manually operable switch may be placed at any convenient position and has the contacts thereof so positioned and connected with respect to the supplemental switch so that but one switch is required to control the movement of the awning in either direction intermediate the limits of travel.

Other objects and advantages will be apparent from the following description and the accompanying drawings in which similar characters of reference designate like parts in the several views.

Fig. 2 is an elevation view showing the general arrangement of the motor, worm gear and the adjusting means for setting the mechanism to operate the reversing and supplemental switch at the limits of travel, showing partly in section a diagrammatic view of the said switch.

Fig. 3 is a diagrammatic view showing the arrangement of the three-pole double-throw snap switch shown in Fig. 2.

Fig. 4 is a wiring diagram showing the connections of the motor with the reversing and supplemental switch shown in a unit as a three-pole double-throw switch and a manually operable switch.

Fig. 5 is a plan view showing the various methods of driving the awnings by gear or belt when the awnings are either in alignment or at right angles to each other.

Fig. 6 is a plan view showing a modified form of the invention in which an electric motor is used to move the awning in one direction and a magnet and a spring awning used for moving the awning in the opposite direction.

Fig. 8 is a wiring diagram showing the connections of the motor and magnet of Fig. 7.

Fig. 9 is a perspective view showing more clearly the arrangement of the contact segments on the stop switch shown in Figures 6 to 8 inclusive.

Figure 1:
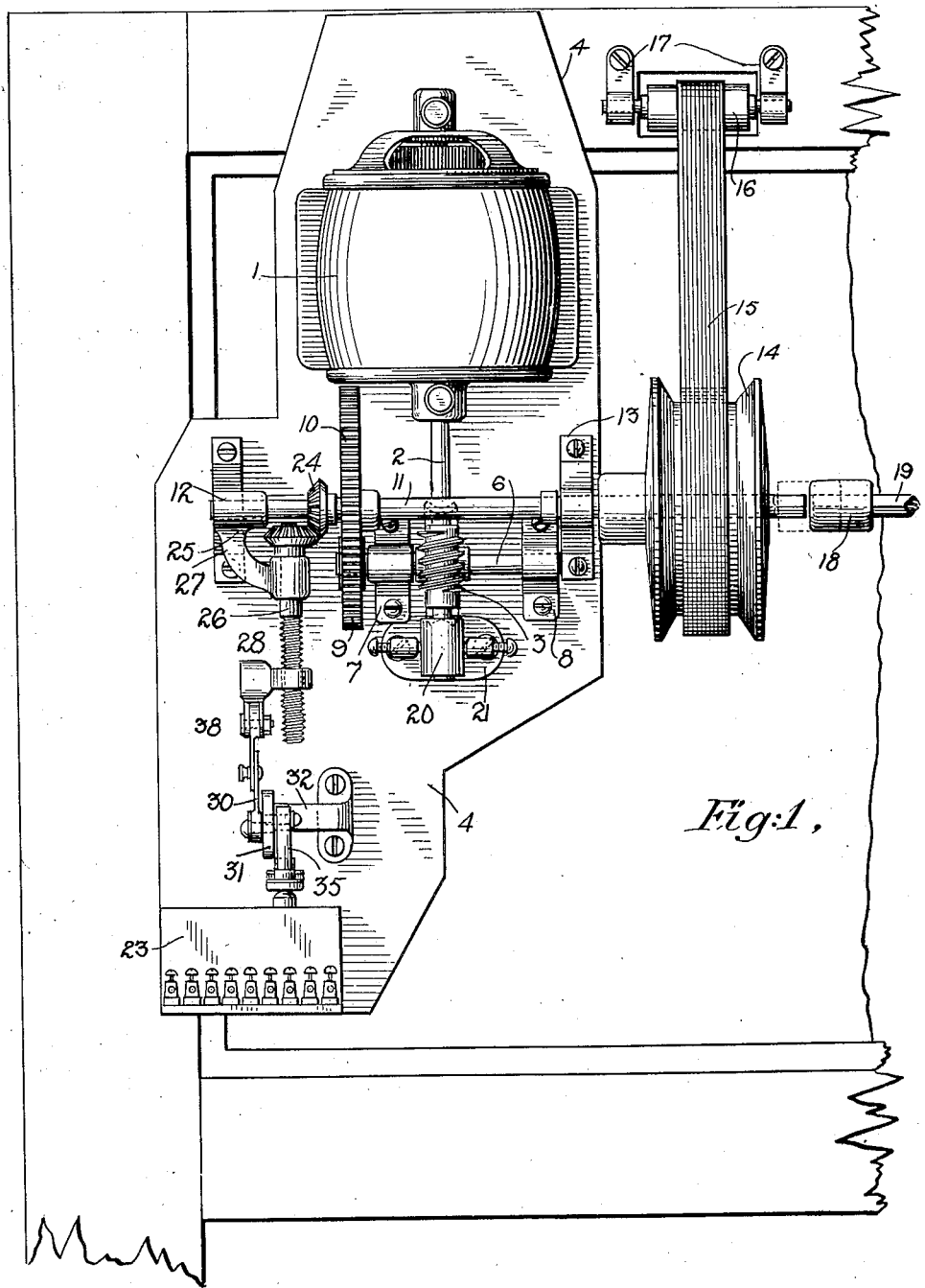
Figure 1 is a plan view showing the application of the invention to an awning of the belt type.

In the drawings showing one of the preferred forms of this invention, an electric motor 1 having a shaft 2 with a worm gear 3 mounted thereon is shown supported on a suitable base 4. One end of the shaft 2 is shown as being supported in a bearing 20, the said bearing being adjustably carried in a support 21 secured to the base 4. A worm gear 5 is shown meshed with the worm gear 3, the said worm gear being fixed on a shaft 6 journalled in suitable brackets 7, 8, said brackets being positioned on the base 4 by any suitable means.

At one end of the shaft 6 is mounted a spur gear 9, the said spur gear 9 meshing with another spur gear 10 secured to another shaft 11 journalled in brackets 12, 13, said brackets also being suitably fixed on the base 4. In operation the gears 9 and 10 are used only for the purposes of speed reduction, it being understood that depending upon the conditions of use, such gears may or may not be used.

On the shaft 11 is mounted a pulley 14 to which may be secured one end of a belt 15, the other end of which is shown extending over a roller 16 journalled in suitable brackets 17, the said end being connected to an awning 22 or other body to be moved.

A coupling 18 is provided so that another driven shaft 19 may be driven through the coupling 18 by the shaft 11. Certain types of awnings are driven through a system of gearing and others by a belt so that it is seen that by providing a coupling 18 the driving mechanism is readily applied to awnings of the various types including those of the belt and gear actuated type.

The worm and gear used as a driving connection between the motor and the awning or other body to be moved performs the additional function of a braking member to prevent movement of the awning after it has been stopped at any predetermined position. This is an important feature in that the use of other independent braking devices is eliminated, thus permitting the awning to be held in position at the limits of travel or any intermediate position.

An automatic control system is provided whereby the movement of the awning is automatically stopped at the limits of travel when it is either in a lowered or raised position. In addition to interrupting the motor circuit when the awning has reached a lowered or raised position, a means is provided for automatically reversing the motor connections for movement in the opposite direction so that it will only be necessary to establish the motor circuit by a circuit closing means or switch, each switch may be operated manually or in any other desired manner.

In the preferred construction shown, a switch or circuit interrupting means 23 is shown comprising a three-pole double-throw push-button snap switch, there being provided a means which will actuate the said switch at the limits of travel. In the construction shown the said means comprises a bevelled gear 24 carried on the shaft 11, the said gear 24 being meshed with another bevelled gear 25 mounted on a shaft 26 journalled in an arm 27 extending from the bracket 12, a portion of the shaft 26 being threaded to guide a member 28 threaded thereon.

An adjustable means is connected with the travelling member 28 for actuating the switch 23 through snap push-buttons 29, 29', a button being provided for each of the limits of travel. For this purpose there is shown an adjustable link 30 having one end thereof connected to the movable member 28 and the other end thereof connected to an arm 31 pivotally carried in a supporting bracket 32 fixed on a suitable support 33. The arm 31 is provided with openings 34 so that one end of the link 30 may be adjusted thereon at various points spaced from its point of pivotal support on the bracket 32, it being understood that when such adjustment is made a corresponding adjustment would have to be made in the link 30. A plurality of plunger rods 35 and 36 is provided at one end thereof pivotally connected to the arm 31 on opposite sides of the point of pivotal support 37 of said arm, the said plungers 35 and 36 being positioned in alignment with the push-buttons 29, 29' respectively so that at one of the limits of travel one of the plungers 35 for example, will press the button 29, thus opening the circuit on one side of the double-throw switch and establishing it on the other side, preferably by a snap action. At the other limit of travel the plunger 36 will contact with the push-button 29' opening the circuit and reestablishing the connections for movement in an opposite direction upon the completion of said circuit through another circuit closing means.

The construction of the circuit interrupting means 23 is not shown in detail herein, such a construction for obtaining a snap action of the switch blades being well known in the art. It is understood, however, that the invention is not to be limited to the type of switch here shown or to the means shown for actuating said switch at the limits of travel.

As an additional safety means, there is provided a limit switch connected in the main circuit so that if the awning exceeds the limit of travel, said switch will function to open the main circuit to prevent further movement of the motor. In the construction shown in Figure 4, said switch is shown as comprising a contact 38 insulated from the travelling member 28 illustrated in Figure 1 in sliding contact with and establishing a circuit through a strip 39, the said strip being of such a length that will permit the main circuit to be broken if, for any reason, the motor should continue rotation after the limit of movement of the driven body has been reached.

There is shown in Figure 4 a wiring diagram giving the connections of a shunt motor M to the various blades of the switch 23 actuated at the limits of travel. There are included in the diagram in addition to the reversing switch and circuit interrupter 23 actuated at the limits of travel, other switches 40 and 41 diagrammatically represented as a three-point and four-point switch respectively, one of which may be operated in any suitable manner. The three-point switch 40 may be of the usual snap switch construction in which in one position a circuit will be established between contacts 42 and 43 by the blade 44, as shown in full lines, and if snapped, the circuit between contacts 42 and 43 will be interrupted, the blade 44 leaving the said contacts 42 and 43 and making electrical connection with contacts 45 and 46. The switch 41 may also be of the usual snap type construction in which in one position a circuit will be established between contacts 47 and 48 by the blade 49 and contacts 50 and 51 by the blade 52, as shown in full lines, but when the switch is again moved, the said blades will be moved to assume a position as indicated by the dotted lines, namely blades 49 connecting contacts 48 and 50, blades 52 connecting contacts 47 and 51. The position of the blades in the switch 23 automatically actuated at a predetermined point, usually the limits of travel, is indicated by the dotted connections 53, 54, 55 between the common central terminals 56, 57, 58 respectively of each of the switches and the end contacts 59, 60, 61 respectively of the triple-pole double-throw switch. When the switch is drawn in the opposite direction, which would represent the position of the blades at the opposite limit of travel, the blades 53, 54 and 55 would connect the central terminals 56, 57 and 58 with contacts 62, 63 and 64 on the other side thereof. It is here to be understood, however, that a series or compound motor may be used particularly in cases requiring a strong starting torque.

In the automatically actuated triple-pole double-throw switch two blades thereof, namely 53 and 54, function as a reversing switch to establish a connection with contacts 59 and 60 or 62 and 63 depending upon the direction of rotation of the motor. The other blade 55, acting successively with the contacts 61 and 64 at the limits of travel, functions as a supplemental three-point switch automatically actuated at the limits of travel, which, in combination with another three-point switch 40, functions to maintain an open circuit after the reversing and supplemental switches have been actuated at the limit of travel to break the motor circuit and to reestablish the motor connections for movement in the opposite direction when the circuit is again completed. The said circuit may be completed by actuating either one of the switches 40 or 41.

If a manually operated switch only is to be used in addition to the automatically actuated switch substantially at the limits of movement, the four contact switch 41 would not be used and a connection made directly between the contacts 43 and 61 and the contacts 50 and 64 respectively, the connection between the contact 58 and the contacts 45 and 42 remaining as shown. If it is desired to control the movement of the awning either by a manual switch or by an automatically actuated switch, the other four-point switches would be provided at the proper points.

Note is here made of the importance of providing the switch 40 connected as shown relative to the automatically actuated supplemental three-point switch.

When the triple-pole double-throw switch, which comprises essentially a double-pole double-throw reversing switch and a single-pole double-throw switch, is automatically actuated to open the motor circuit and change the motor connections for movement in the opposite direction, with the switch 40 connected as shown relative to the supplemental switch, the circuit for the motor is opened at the switch 40 between the contacts 45 and 46 and thus further movement of the body is prevented. It is thus seen that the awning is moved in the opposite direction upon completing the circuit through the switch 40 or through another switch 41, which may be actuated manually or by a time device.

If while the awning is being moved in one direction, it is desired to arrest further movement thereof at any point intermediate the limits of travel, the switch 40 may be actuated, thus breaking the circuit and stopping the awning at any intermediate predetermined position. If it is desired to continue movement in the same direction, the circuit is again established through the switch 40, but it is to be noted that movement in the opposite direction cannot be had until the motor connections have been reversed for such a movement, which, in the arrangement shown, is accomplished when the body has reached its raised or lowered position.

Figure 7:
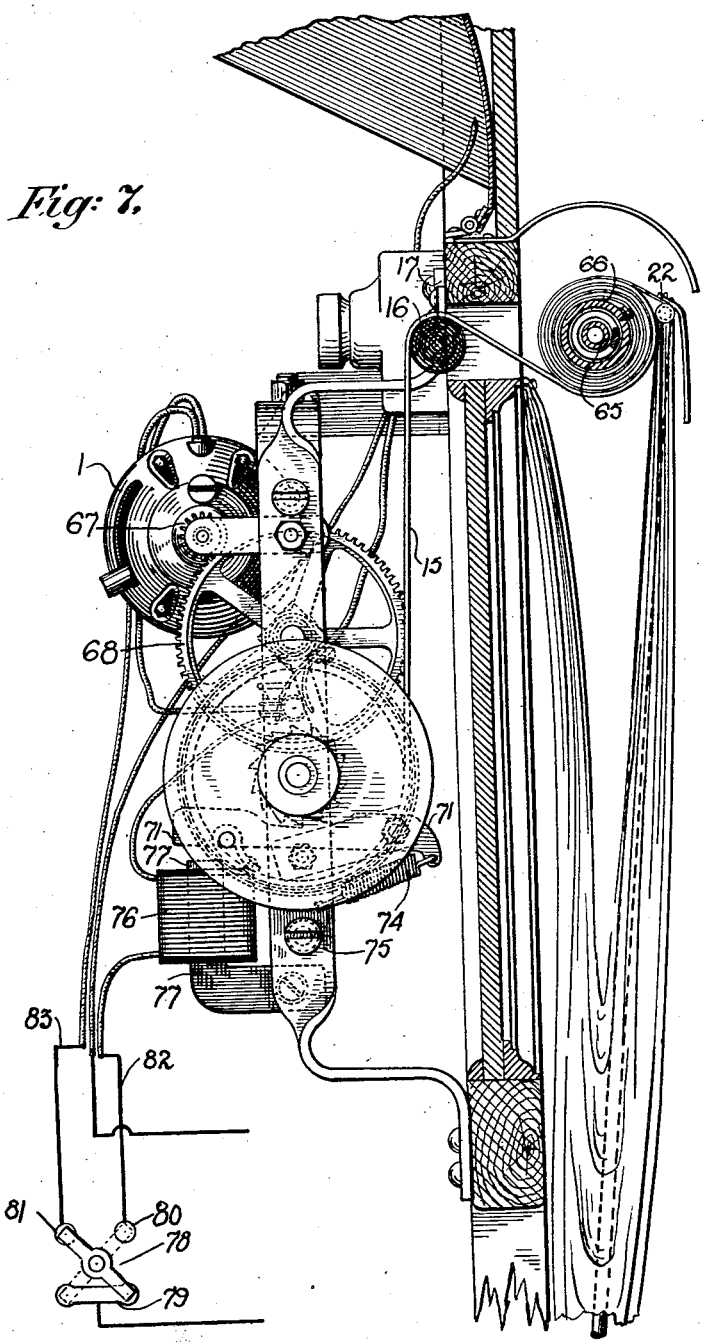
Fig. 7 is a side view showing more clearly the arrangement of the spring awning.

A modified form of the invention is shown in Figures 6 and 7 wherein an electric motor 1 is provided to move the awning 22 in one direction, as for example, to lower the awning, and a spring motor 65 shown as mounted within an awning roller 66 is provided to raise the awning. A train of gears 67, 68, 69 and 70 is provided between the motor shaft carrying the gear 67 and the pulley 16 to which the belt 15 is secured. When the motor lowers the awning by the winding of the belt 15 upon the pulley 14, the spring in the awning roller 66 is put under a tension, the awning being held in such a lowered position by a spring-pressed pawl 71 engaging a ratchet wheel 72 mounted on a shaft 73 to which the pulley 14 is fixed and a spring 73' serves to maintain the same in its proper position.

A spring 74 is provided having one end thereof connected to one end of the pivoted pawl 71 and the other end thereof connected to a relatively fixed frame support 75. An electro-magnet 76 having a core 77 is secured by a suitable means to the frame member 75 and is so positioned that the core 77 of the magnet 76 may attract the pawl 71 and disengage the said pawl from the ratchet wheel 72.

As a means of controlling the movement of the awning to arrest further movement thereof when in a raised or lowered position, a means is provided for automatically stopping the movement thereof at the limits of travel. A three-point switch 78 is preferably used to control the movement of the awning, the common contact 79 being connected with a suitable source of power, and each of the other contacts 80 and 81 being connected with the motor 1 and the winding 76 of the electro-magnet through conductors 82 and 83 respectively.

As a means of interrupting the motor circuit at one of the limits of travel and of the electro-magnet at the other limit of travel, there is provided a limit switch which comprises a rod 84 composed of a suitable insulating material on which there are mounted oppositely disposed contact strips 85 and 86 connected with the electro-magnet 76 and the motor 1 by the conductors 87 and 88 respectively. A forked contact finger 89 is arranged to be in sliding contact with the contact strips 85 and 86 so that when the contact 89 leaves the strip 85 at one of the limits of travel, the circuit for the electro-magnet will be interrupted and when the contact leaves the strip 86 at the other end of the rod 84, the circuit for the motor 1 will be interrupted.

As a means of moving the forked contact finger 89 to correspond to a movement of the awning a threaded nut 90 is fixed at the end of the finger 89 and guided on a threaded rod 90 which is connected to the gear 68 to turn therewith, the gearing ratio, the pitch of the threads and the length of the strips 85 and 86 being so arranged and proportioned that the sliding finger contact member 89 will leave the contact strips 85 and 86 at the limits of travel of the awning. It is thus seen that when the circuit for the motor 1 is completed by the switch 78 through the contacts 79 and 81, the motor will be energized moving the awning to a lowered position when the circuit for said motor will be interrupted, the awning being held in such a position by engagement of the pawl 71 with the ratchet wheel 72.

When it is desired to raise the awning, the circuit for the magnet 76 is completed by the switch 78 through the contacts 79 and 80 when the pawl 71 will be attracted by the energized magnet 77, thus disengaging the pawl 71 from the ratchet wheel 72 and thus permitting the spring 65 to be effective and move the awning to a raised position, the circuit for the magnet 76 being interrupted when such a position is reached through the sliding contact 89 and the contact strip 85.

The usual arrangement of the belt 15, relative to the awning 22, the roller 66 and the spring 65 therein, is provided so that in order to apply the control means to an awning already installed or to be installed, it is only necessary to fix one end of the belt 15 in the driven pulley 16.

Figure 8 is a wiring diagram showing the electrical connections for controlling the movement of the awning. As before stated, the common contact 79 of the three-point switch is connected with one side of the line by a conductor 91, the sliding finger contact 89 being connected with the other side of the line by a conductor 92. The circuits through the magnet 76 and the motor 1 are the same as heretofore have been noted.

In Figure 5 there are shown diagrammatically various arrangements of awnings to which the control means may be readily adapted. Belt driven awnings 93 are shown arranged at right angles to another belt driven awning 94, and the arrangement of the shafting 95 and 96 connected by suitable bevelled gearing 97 is shown, the motor 1 being arranged to move the awning through the shafting, gearing and belt connections. There are certain types of awnings which are provided with a gear actuated awning roll as shown at 98.

If it is desired to operate a number of awnings at different levels from a common prime mover, such may readily be done by providing a vertically extending shaft 99 connecting with the awning drive mechanism at a different level and connecting said awning with the prime mover by a suitable means, as for example, through a shaft 100 and gearing 101. A coupling 102 may be provided, if desired, so as to disengage the main drive shaft 96 from the awning 98 so that said awning may, if desired, be actuated by a manual means as indicated at 103.

Certain changes and modifications may be made without departing from the spirit and scope of this invention.

Having thus described the invention, what we claim as new is:

1. An automatic control device for awnings comprising a motor, a circuit therefor, an awning having a spring therefor to move it in one direction, a driving connection between said motor and said awning, a switch device having a contact controlled by the movement of said awning, a ratchet driven by said driving connection, a stop therefor normally engaging said ratchet, a magnet to control said stop, said magnet being arranged in a circuit and a switch interposed within both of said circuits for permitting an energizing of either said motor or magnet.

2. A control device for awnings comprising an awning, an electric motor, a circuit therefor, connecting mechanism between the awning and the motor, a switch device having a sliding contact positioned by the movement of the awning in series with said motor to interrupt said motor circuit at one of the limits of travel of the awning, a spring motor for moving said awning in one direction, a magnet, a circuit therefor, said circuit including in series therewith a manually operable switch, the first-named switch being controlled by the movement of the awning to open the circuit of the magnet at the other limit of travel of the awning, a holding device driven by the connecting mechanism between the motor and the awning, and a stop member normally engaging said holding device to hold it against rotation, said stop member being positioned adjacent said magnet to be subject to the influence thereof to be withdrawn from the holding device when said magnet is energized.

3. In an awning control device, an awning, a spring motor for moving said awning in one direction, a positioning device for holding the awning at the limit of travel in the one direction, an electro-responsive device controlling said positioning device, an electric motor, connecting mechanism between said motor and said awning, said connection being arranged to permit the motor to move the awning in a direction opposite to the spring motor, means for manually establishing the motor circuit, and means for automatically opening the motor circuit at one of the limits of the awning travel.

WILLIAM GREBLER.
LOUIS OSKOW.